(12) United States Patent
Hayakawa et al.

(10) Patent No.: US 9,748,850 B2
(45) Date of Patent: Aug. 29, 2017

(54) SWITCHING POWER-SUPPLY WITH SWITCHING FREQUENCY CORRECTION

(71) Applicant: SANKEN ELECTRIC CO., LTD., Niiza-shi, Saitama (JP)

(72) Inventors: Akira Hayakawa, Fujimino (JP); Masaaki Shimada, Fujimi (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 0 days.

(21) Appl. No.: 14/972,084

(22) Filed: Dec. 17, 2015

(65) Prior Publication Data

US 2016/0294293 A1    Oct. 6, 2016

(30) Foreign Application Priority Data

Mar. 30, 2015   (JP) ................. 2015-068357

(51) Int. Cl.
  *H02M 3/335*   (2006.01)
  *H02M 1/10*    (2006.01)
  *H02M 7/04*    (2006.01)
  *H02M 1/00*    (2006.01)

(52) U.S. Cl.
  CPC .......... *H02M 3/33523* (2013.01); *H02M 1/10* (2013.01); *H02M 7/04* (2013.01); *H02M 2001/007* (2013.01)

(58) Field of Classification Search
  USPC ................. 363/21.01, 21.04–21.18
  See application file for complete search history.

(56) References Cited

U.S. PATENT DOCUMENTS

| | | | | |
|---|---|---|---|---|
| 2011/0255308 A1* | 10/2011 | Chan | ................. | H02M 3/33507 363/21.12 |
| 2013/0051089 A1* | 2/2013 | Pan | ......................... | H02M 1/44 363/21.17 |
| 2013/0077358 A1* | 3/2013 | Gaknoki | ........... | H02M 3/33507 363/21.17 |
| 2013/0236206 A1* | 9/2013 | Shoji | ...................... | G03G 15/80 399/88 |
| 2014/0328090 A1* | 11/2014 | Takahashi | ......... | H02M 3/33507 363/21.17 |

FOREIGN PATENT DOCUMENTS

JP      2010-158167       7/2010

* cited by examiner

*Primary Examiner* — Alex Torres-Rivera
(74) *Attorney, Agent, or Firm* — Banner & Witcoff, Ltd.

(57) ABSTRACT

A switching power-supply device applies a DC voltage to a primary winding of a transformer and performs a switching operation of a switching element connected to a primary winding to generate and output an output voltage to a load. The switching power-supply device includes: an error amplifier, which compares the output voltage with a reference voltage and sends an error voltage as a feedback signal to a primary side; a frequency generation circuit, which generates a switching frequency according to the feedback signal; an off timing determination circuit, which determines a timing at which the switching element is turned off, by comparing a signal depending on the feedback signal with a current flowing through the switching element; and a frequency correction circuit, which corrects the switching frequency generated by the frequency generation circuit, according to an on-duty of the switching element.

2 Claims, 5 Drawing Sheets

SWITCHING POWER-SUPPLY WITH SWITCHING FREQUENCY CORRECTION

CROSS-REFERENCE TO RELATED APPLICATION

This application claims priority from Japanese Patent Application No. 2015-068357 filed on Mar. 30, 2015, the entire subject matter of which is incorporated herein by reference.

TECHNICAL FIELD

This disclosure relates to a switching power-supply device configured to perform an output voltage control by a switching operation.

BACKGROUND

In a switching power-supply device, there is a technique to reduce a loss in a switching element by reducing a switching frequency in a light or middle load and thereby improves efficiency (e.g., refer to JP-A-2010-158167).

SUMMARY

Voltages of commercial AC power source are different depending on country, and is roughly classified into a 100V system of 100V to 120V and a 200V system of 200V to 260V. The switching power-supply device is required to support to all of these input voltages. However, in the background art, a frequency variable operation point for starting a reduction in switching frequency or a reduction rate thereof is controlled based on one setting that is prepared beforehand. Therefore, even if an input voltage is different, the frequency variable operation point or reduction rate for the switching frequency uses common setting. Accordingly, depending on the input voltage an operation in the preferable switching frequency cannot be performed, so that it is impossible to improve efficiency as desired.

Therefore, this disclosure is to provide a switching power-supply device capable of realizing an operation by an optimal switching frequency according to an input voltage.

A switching power-supply device applies a DC voltage obtained by rectifying input voltage of AC power source to a primary winding of a transformer and performs a switching operation of a switching element connected to the primary winding of the transformer to generate a pulse voltage on a secondary winding of the transformer and output an output voltage to a load, the output voltage being rectified and smoothed by a rectification and smoothing circuit of a secondary side having a rectifier diode and a smoothing capacitor. The switching power-supply device includes: an error amplifier, which compares the output voltage with a reference voltage and sends an error voltage as a feedback signal to a primary side; a frequency generation circuit, which generate a switching frequency according to the feedback signal; an off timing determination circuit, which determines a timing at which the switching element is turned off, by comparing a signal depending on the feedback signal with a current flowing through the switching element; and a frequency correction circuit, which corrects the switching frequency generated by the frequency generation circuit, according to an on-duty of the switching element.

According to this disclosure, it is possible to provide a switching power-supply device capable of realizing an operation by an optimal switching frequency according to an input voltage.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
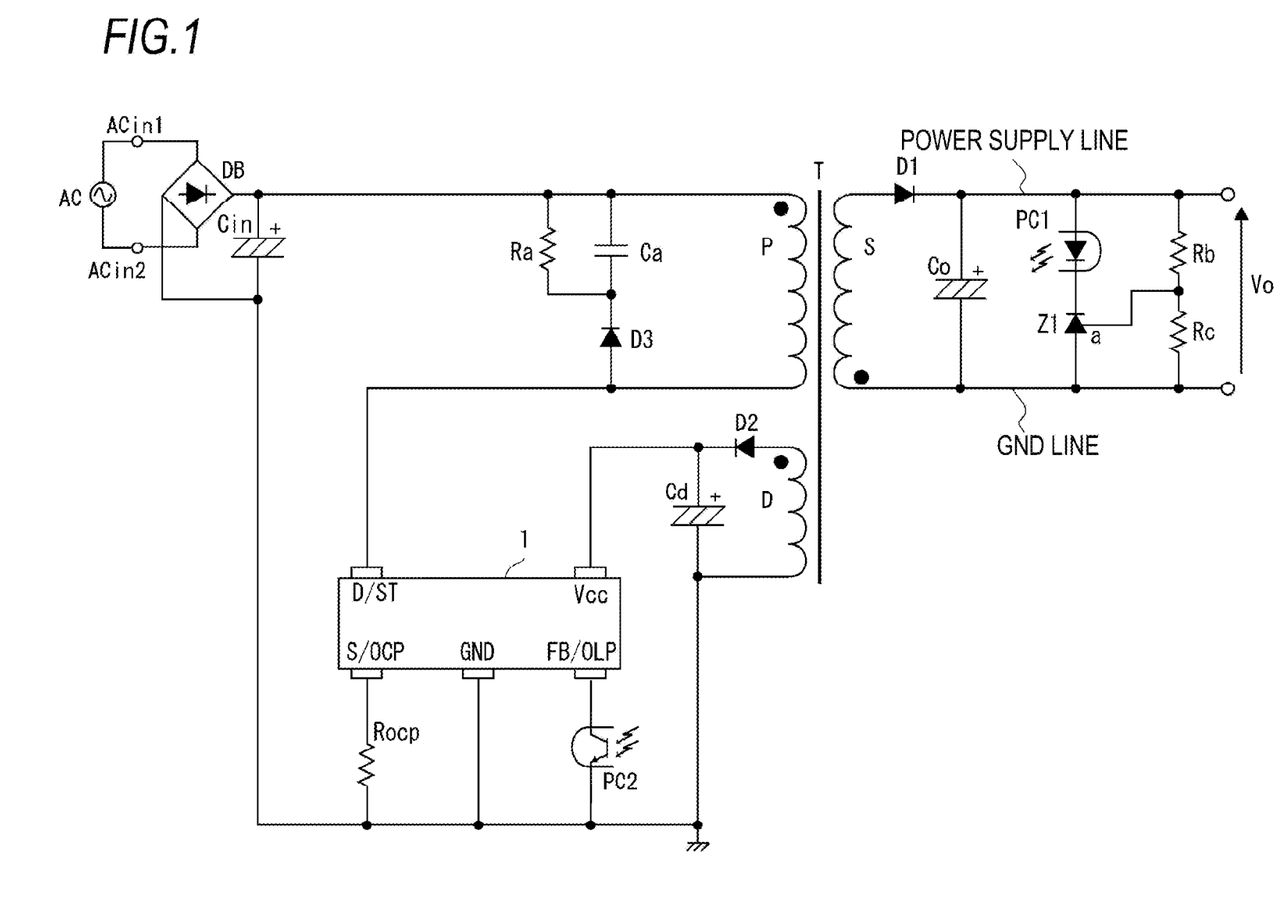
FIG. 1 is a circuit diagram illustrating the configuration of a circuit of an embodiment of a switching power-supply device according to this disclosure.

Referring to FIG. 1, a switching power-supply device of the present embodiment includes a rectifier circuit DB, smoothing capacitors Cin, Co and Cd, a transformer T, a controller IC1, rectifier diodes D1 and D2, a shunt regulator Z1, a light emitting diode PC1 and a light receiving transistor PC2 constituting a photo coupler, a current detection resistor Rocp, resistors Rb and Rc, and a capacitor C4.

A commercial AC power source AC is connected to AC input terminals ACin1 and ACin2 of the rectifier circuit DB in which a diode forms a bridge, and an AC voltage input from the commercial AC power source AC is full-wave rectified and then output from the rectifier circuit DB. The smoothing capacitor Cin is connected between a rectifier output positive terminal and a rectifier output negative terminal of the rectifier circuit DB. The rectifier output negative terminal of the rectifier circuit DB is connected to a ground terminal. Accordingly, DC power (input voltage) is obtained by rectifying and smoothing the commercial AC power source AC in the rectifier circuit DB and the smoothing capacitor Cin.

The controller IC1 has a switching element such as a power MOSFET (Metal Oxide Semiconductor Field Effect Transistor) and a control circuit to perform switching control of the switching element, and includes a D/ST (MOSFET drain/start current input) terminal, a S/OCP (MOSFET source/overcurrent protection) terminal, a Vcc (control circuit power voltage input) terminal, a FB/OLP (feedback signal input/overload protection signal input) terminal, and a GND terminal.

The transformer T supplying power from a primary side (input side) to a secondary side (load side) includes a primary winding P, an auxiliary winding D, and a secondary winding S. The rectifier output positive terminal of the rectifier circuit DB is connected to one end of the primary winding P of the transformer T, the other end of the primary winding P of the transformer T is connected to the D/ST terminal of the controller IC1, and the S/OCP terminal of the controller IC1 is connected to the ground terminal through the resistor Rocp. Accordingly, power applied to the primary winding P of the transformer T is transmitted to the secondary winding S of the transformer T by performing on-off control of the switching element included in the controller IC1, so that pulse voltage is generated in the secondary winding S of the transformer T. The current detection resistor Rocp is connected as a resistor to detect a current flowing through the switching element included in the controller IC1 as a voltage signal $V_{ocp}$. The controller IC1 has an overcurrent protection (OCP) function to limit power supplied to the secondary side, if the voltage signal $V_{ocp}$ corresponding to the current flowing through the switching element is equal to or greater than a preset overcurrent threshold.

A snubber circuit having a diode D3, a capacitor Ca, and a resistor Ra is connected between both ends of the primary winding P of the transformer T. The diode D3 and the capacitor Ca are connected in series between both ends of the primary winding P of the transformer T, and the resistor Ra is connected in parallel to the capacitor Ca. The diode D3 is connected in a direction where the diode D3 is biased forwards by a voltage generated in the primary winding P of the transformer T when the switching element included in the controller IC1 is turned off.

The smoothing capacitor Co is connected between both terminals of the secondary winding S of the transformer T through the rectifier diode D1. The voltage generated by the secondary winding S of the transformer T is rectified and smoothed by the rectifier diode D1 and the smoothing capacitor Co, and voltage between the terminals of the smoothing capacitor Co is output as an output voltage Vo from an output terminal. A line connected to the positive terminal of the smoothing capacitor Co becomes a power supply line, while a line to which the negative terminal of the smoothing capacitor Co is connected becomes a GND line connected to the ground terminal.

The light emitting diode PC1 and the shunt regulator Z1 functioning as an error amplifier are connected in series between the power supply line of the output and the GND line. An anode of the light emitting diode PC1 is connected to the power supply line of the output, a cathode of the light emitting diode PC1 is connected to a cathode of the shunt regulator Z1, and an anode of the shunt regulator Z1 is connected to the GND line. A resistor Rb and a resistor Rc for dividing voltage are connected in series between the power supply line and the GND line, and a connection point between the resistor Rb and the resistor Rc is connected to a control terminal a of the shunt regulator Z1. The output voltage Vo divided by the resistor Rb and resistor Rc is input into the control terminal a of the shunt regulator Z1 and is compared with an internal reference voltage of the shunt regulator Z1. A current depending on an error voltage flows through the light emitting diode PC1, and then the current flowing through the light emitting diode PC1 is output from the light emitting diode PC1 to the light receiving transistor PC2 of the primary side as a FB (feedback) signal. The controller IC1 controls the duty ratio or switching frequency of the switching element based on the FB signal that is input into the FB/OLP terminal and thereby controls an amount of power supplied to the secondary side.

The smoothing capacitor Cd is connected between both terminals of the auxiliary winding D of the transformer T through the rectifier diode D2, and a connection point between the rectifier diode D2 and the smoothing capacitor Cd is connected to the Vcc terminal of the controller IC1. Therefore, the voltage generated in the auxiliary winding D is rectified and smoothed by the rectifier diode D2 and the smoothing capacitor Cd and then is supplied to the Vcc terminal of the controller IC1 as the power supply voltage Vcc for ICs.

Next, the circuit configuration of the controller IC1 illustrated in FIG. 1 will be described with reference to FIG. 2.

Figure 2:
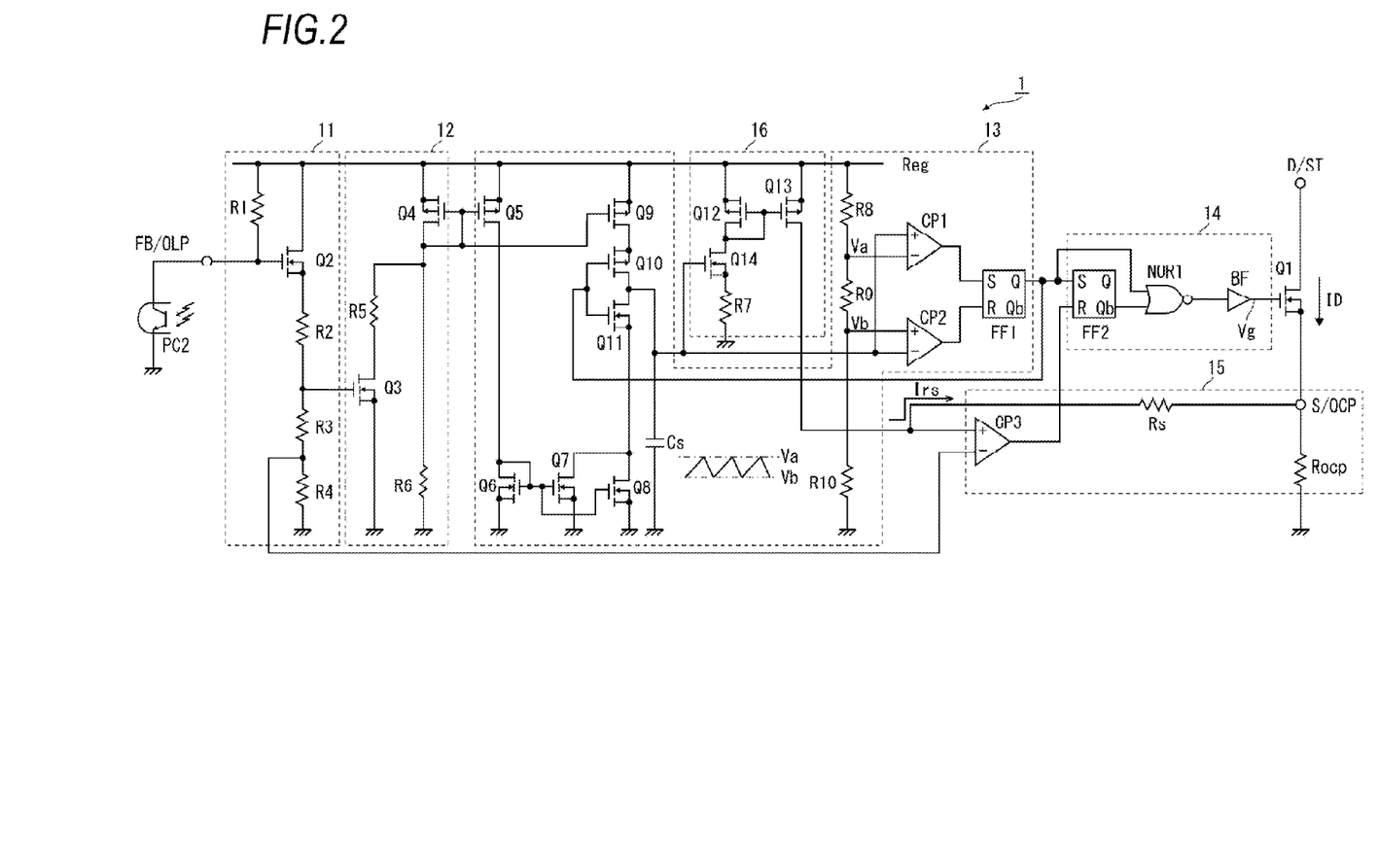
FIG. 2 is a circuit diagram illustrating the configuration of a circuit of a first embodiment of a controller IC shown in FIG. 1.

As shown in FIG. 2, the controller IC1 includes a switching element Q1 of an N channel type of power MOSFET, an FB signal detection unit 11, a frequency changing circuit 12, a frequency generation circuit 13, a switching-element driving circuit 14, an S/OCP detection circuit 15, and a switching-current-waveform correction circuit 16.

The FB signal detection unit 11 includes resistors R1 to R4, and an N-type MOSFET Q2. A gate of the N-type MOSFET Q2 is connected to the FB/OLP terminal to which the light receiving transistor PC2 is connected, and is connected to a regulator voltage Reg through the resistor R1. A drain of the N-type MOSFET Q2 is connected to the regulator voltage Reg. A source of the N-type MOSFET Q2 is integrally connected to the primary side GND through the series resistors, that is, the resistors R2 to R4. Therefore, the voltage of a connection point between the resistor R2 and the resistor R3 and the voltage of a connection point between the resistor R3 and the resistor R4 are voltage depending on the FB signal, and this voltage is output to the frequency changing circuit 12 and the S/OCP detection circuit 15.

The frequency changing circuit 12 includes an N-type MOSFET Q3, resistors R5 and R6, and a P-type MOSFET Q4. A gate of the N-type MOSFET Q3 is connected to a connection point between the resistor R2 and the resistor R3. The P-type MOSFET Q4 and the resistor R6 are connected in series between the regulator voltage Reg and the primary side GND, and a drain of the N-type MOSFET Q3 is connected to a drain and a gate of the P-type MOSFET Q4 through the resistor R5. Therefore, a drain current of the P-type MOSFET Q4 becomes a current value depending on the FB signal, and this current value is output to the frequency generation circuit 13.

The FB signal from the secondary side is changed depending on a load state. The FB signal increases from a heavy-load state through a light-load state towards a no-load state. For example, in the case of the light-load state, a current having a relatively large FB signal flows through the light receiving transistor PC2 to reduce the gate voltage of the N-type MOSFET Q2. Therefore, the drain current of the N-type MOSFET Q3, the gate of which is connected to the connection point between the resistor R2 and the resistor R3, is also reduced, and also the drain current of the P-type MOSFET Q4 is reduced.

The frequency generation circuit 13 includes P-type MOSFETs Q5, Q9 and Q10, N-type MOSFETs Q6 to Q8 and Q11, a capacitor Cs, resistors R8 to R10, comparators CP1 and CP2, and an SR-type flip-flop FF1. The P-type MOSFET Q4 of the frequency changing circuit 12 and the P-type MOSFETs Q5 and Q9 constitute a current mirror circuit, and a drain of the N-type MOSFET Q3 of the frequency changing circuit 12 is connected to a gate of the P-type MOSFETs Q4, Q5 and Q9 through the resistor R5.

The P-type MOSFET Q5 becomes a current source of the N-type MOSFETs Q6 to Q8 constituting the current mirror circuit.

The P-type MOSFETs Q9 and Q10, the N-type MOSFET Q11, and a parallel circuit of the N-type MOSFETs Q7 and Q8 is connected in series between the regulator voltage Reg and the primary side GND, and the capacitor Cs is connected between the connection point between the P-type MOSFET Q10 and the N-type MOSFET Q11 and the primary side GND. Therefore, the capacitor Cs is charged or discharged by the complementary on-off operation with the P-type MOSFET Q10 and the N-type MOSFET Q11. That is, when the P-type MOSFET Q10 is in ON state, the capacitor Cs is charged at drain current of the P-type MOSFET Q9. When the N-type MOSFET Q11 is in ON state, the capacitor Cs is discharged at drain current (this current is twice as large as charging current, if the current ratio of the P-type MOSFET Q10 to the N-type MOSFET Q7 or Q8 is 1:1) of the N-type MOSFETs Q7 and Q8.

A charge and discharge switching timing of the capacitor Cs, namely, the complementary on-off switching timing of the P-type MOSFET Q10 and the N-type MOSFET Q11 is defined by the resistors R8 to R10, the comparators CP1 and CP2, and the flip-flop FF1. The resistors R8 to R10 is connected in series between the regulator voltage Reg and the primary side GND. The connection point between the resistor R8 and the resistor R9 is connected to an inverted input terminal of the comparator CP1, while the connection point between the resistor R9 and the resistor R10 is connected to a non-inverted input terminal of the comparator CP2. The capacitor Cs is connected to a non-inverted input terminal of the comparator CP1 and an inverted input terminal of the comparator CP2, and the voltage Vcs of the capacitor Cs is input thereto. The output terminal of the comparator CP1 is connected to a set terminal S of the flip-flop FF1, the output terminal of the comparator CP2 is connected to a reset terminal R of the flip-flop FF1, and the output terminal Q of the flip-flop FF1 is connected to a gate of the P-type MOSFET Q10 and the N-type MOSFET Q11. Therefore, if the voltage Vcs of the capacitor Cs is increased by the charge and then the voltage Vcs reaches the voltage Va of the connection point between the resistor R8 and the resistor R9, the flip-flop FF1 is set by the comparator CP1. When the flip-flop FF1 is set, the output of the output terminal Q becomes an H level, the P-type MOSFET Q10 is in OFF state and the N-type MOSFET Q11 is in ON state, and thereby the capacitor Cs is discharged. Thereafter, when the voltage Vcs of the capacitor Cs is decreased by the discharge to reach the voltage Vb of the connection point between the resistor R9 and the resistor R10, the flip-flop FF1 is reset by the comparator CP2. When the flip-flop FF1 is reset, the output of the output terminal Q becomes an L level, the P-type MOSFET Q10 is in ON state and the N-type MOSFET Q11 is in OFF state, and thereby the capacitor Cs is charged.

The switching-element driving circuit 14 includes an SR-type flip-flop FF2, an NOR circuit NOR1, and a buffer BF. The output Q of the flip-flop FF1 is connected to a set terminal S of the flip-flop FF2 and one of input terminals of the NOR circuit NOR1, and an inverted output terminal Qb of the flip-flop FF2 is connected to the other input terminal of the NOR circuit NOR1. An output terminal of the NOR circuit NOR1 is connected to a gate of the switching element Q1 through the buffer BF, and an output of the NOR circuit NOR1 becomes a gate signal Vg for performing the switching control of the switching element Q1. Therefore, as the flip-flop FF1 set, the flip-flop FF2 is set, and subsequently as resetting the flip-flop FF1, the switching element Q1 is turned on. When the flip-flop FF2 is reset, the switching element Q1 is turned off.

An output terminal of the comparator CP3 is connected to the reset terminal R of the flip-flop FF2. The comparator CP3, the resistor Rs and the externally attached current detection resistor Rocp constitutes the S/OCP detection circuit 15 that detects overcurrent and controls the output voltage Vo by comparing the FB signal with the switching current flowing through the switching element Q1. The non-inverted terminal of the comparator CP3 is connected to the S/OCP terminal (connection point between the source of the switching element Q1 and the current detection resistor Rocp) through the resistor Rs. The inverted terminal of the comparator CP3 is connected to the connection point between the resistor R3 and the resistor R4, and a signal depending on the FB signal is input thereto. Therefore, from when the flip-flop FF1 is reset, i.e. when the charge of the capacitor Cs is started, to when the flip-flop FF2 is reset by the comparator CP3, the switching element Q1 becomes on-duty. By comparing the FB signal with a current flowing through the switching element Q1, the S/OCP detection circuit 15 functions as an off timing determination circuit and determines a timing at which the switching element Q1 is turned off.

A correcting current Irs generated by the switching-current-waveform correction circuit 16 superimposes on the non-inverted terminal of the comparator CP3. The switching-current-waveform correction circuit 16 includes P-type MOSFETs Q12 and Q13 constituting the current mirror circuit, an N-type MOSFET Q14 varying the mirror current of the P-type MOSFETs Q12 and Q13 depending on the voltage Vcs of the capacitor Cs, and a resistor R7. A drain of the P-type MOSFET Q13 is connected to the non-inverted terminal of the comparator CP3. Gates of the P-type MOSFETs Q12 and Q13, a drain of the P-type MOSFET Q12, and a drain of the N-type MOSFET Q14 are connected to each other, a gate of the N-type MOSFET Q14 is connected to the capacitor Cs, and a source of the N-type MOSFET Q14 is connected to the primary side GND through the resistor R7. Therefore, the drain current of the N-type MOSFET Q14 flows equally through the P-type MOSFETs Q12 and Q13 of the current mirror circuit, so that it superimposes on the non-inverted terminal of the comparator CP3 through the resistor Rs as the correcting current Irs. If the switching current waveform is corrected by the correcting current Irs, the comparator CP3 outputs a signal turning off the switching element Q1 to the reset terminal of the flip-flop FF2, before reaching an original switching current value. Therefore, the voltage of the control terminal a of the shunt regulator Z1 is reduced, so that control keeping the output voltage Vout constant is performed. Then, the FB/OLP terminal voltage of the FB signal to which the light receiving transistor PC2 is connected rises, and a charge/discharge current to the capacitor Cs increases, so that a switching frequency rises. As described above, the switching-current-waveform correction circuit 16 functions as a frequency correction circuit to correct a switching frequency generated by the frequency generation circuit 13, depending on the on-duty of the switching element Q1.

Figure 3:
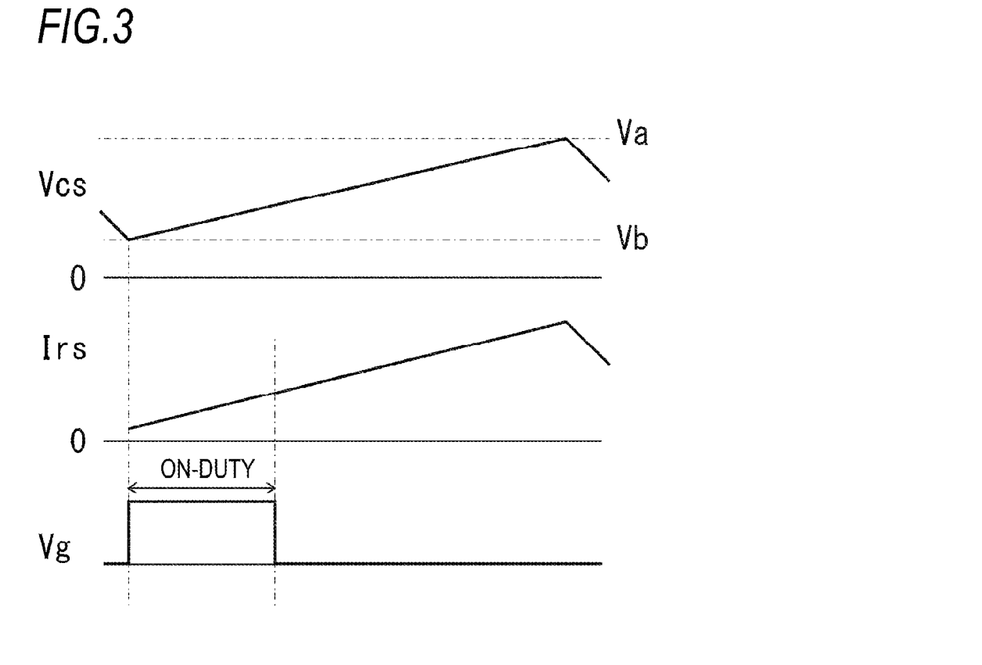
FIG. 3 is a waveform diagram illustrating a relation between an on-duty and a correcting current of a switching element shown in FIG. 2.

The drain current of the N-type MOSFET Q14 is changed depending on the voltage Vcs of the capacitor Cs. Since the voltage Vcs of the capacitor Cs has the waveform of a triangle wave, the correcting current Irs flowing through the resistor Rs rises as passing time, during the charge of the capacitor Cs, as shown in FIG. 3. Therefore, as the on-duty increases, the correcting current Irs also increases, and thereby the switching current waveform is greatly corrected.

Figure 4:
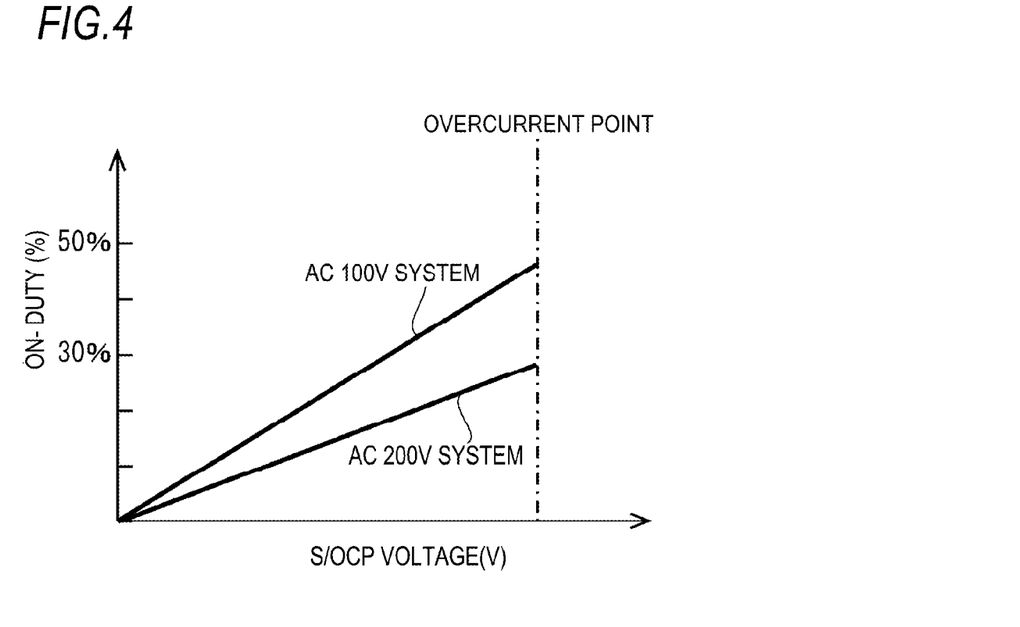
FIG. 4 is a waveform diagram illustrating a relation between the on-duty and an input voltage of the switching element shown in FIG. 2.

As shown in FIG. 4, if the load condition is the same, the on-duty of the switching element Q1 in a case where the input voltage is the AC 100V system is larger than the on-duty of the switching element Q1 in a case where the input voltage is the AC 200V system. Therefore, the switching current waveform in a case where the input voltage is the AC 100V system is greatly corrected by the correcting current Irs as compared to a case where the input voltage is the AC 200V system. As a result, the switching frequency rises at an early stage.

In a case where the load condition is changed from the no load to the heavy load, a rise in switching frequency of the AC 100V system starts at an earlier stage as compared to AC 200V system. In the AC 200V system, a change in frequency is insufficient in a range from the no load to the middle load, and the switching frequency starts to rise under the condition where the load is changed from the middle load to the heavy load.

Figure 5:
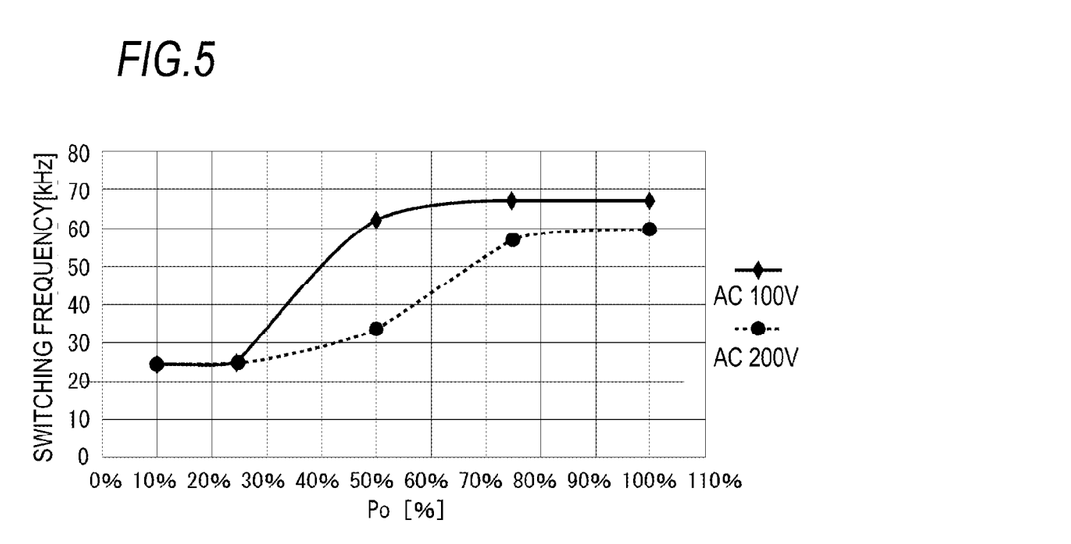
FIG. 5 is a graph illustrating an efficiency improvement effect of the embodiment of the switching power-supply device according to this disclosure.

FIG. 5 illustrates a relation between a load factor Po (%) and a switching frequency (kHz) when a frequency reducing function is performed in the present embodiment. A solid line shows a frequency reduction curve in a case where the input voltage is the AC 100V system, and a dotted line shows a frequency reduction curve in a case where the input voltage is the AC 200V system. As shown in FIG. 5, the reduction in load factor in a case where the input voltage is the AC 200V system starts a reduction in switching frequency at a faster timing as compared to case where the input voltage is the AC 100V system. Further, in a case where the load is changed from the middle load to the light load, the switching frequency in a case where the input voltage is the AC 100V system is controlled to be higher than the switching frequency in a case where the input voltage is the AC 200V system.

If the input voltage is the AC 100V system, since the input voltage is low, the loss of the switching element Q1 is mainly due to a conduction loss resulting from an on-resistance rather than a switching loss. According to this invention, a peak value of the switching current is suppressed by increasing the switching frequency depending on the load condition. Therefore, it is possible to relatively suppress the conduction loss of the switching element Q1 and to improve efficiency.

If the input voltage is the AC 200V system, since the input voltage is high, the loss of the switching element Q1 is mainly due to the switching loss rather than the conduction loss. According to this invention, the switching current is suppressed in the range from the light load to the middle load by increasing the switching frequency depending on the load condition (on-duty). Therefore, it is possible to relatively suppress the switching loss of the AC 200V system and to improve efficiency.

Figure 6:
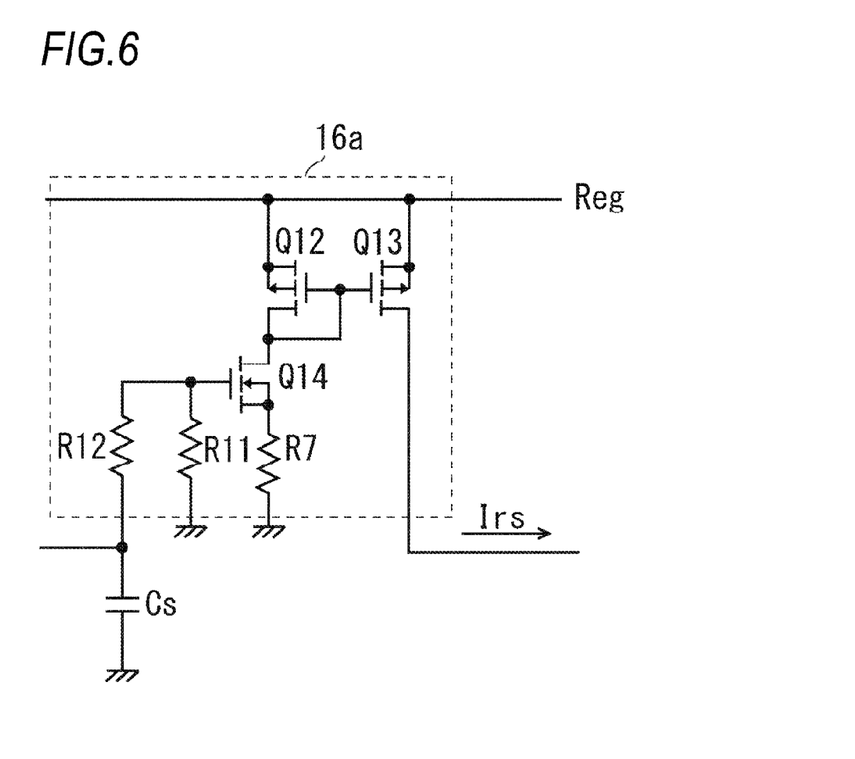
FIG. 6 is a circuit diagram illustrating the configuration of a circuit of another embodiment of a switching-current-waveform correction circuit shown in FIG. 2.
Figure 7:
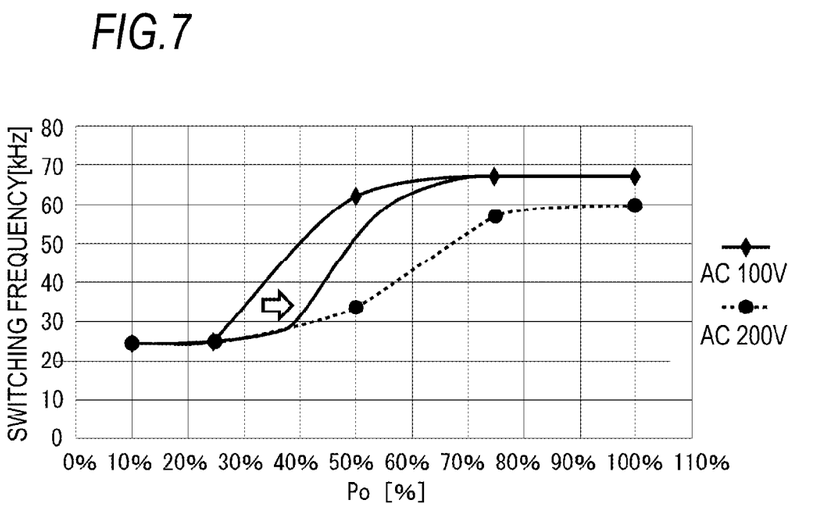
FIG. 7 is a waveform diagram illustrating a relation between an on-duty and the input voltage of a switching element, in the circuit diagram of another embodiment of the switching-current-waveform correction circuit shown in FIG. 6.

As shown in FIG. 6, a switching-current-waveform correction circuit 16a, in which a resistor R11 and a resistor R12 are connected in series between the GND and the capacitor Cs and a connection point between the resistor R11 and the resistor R12 is connected to the gate of the N-type MOSFET Q14, may be used. According to the switching-current-waveform correction circuit 16a, by setting resistance values of the resistor R11 and the resistor R12, it is possible to control a timing at which the correcting current Irs starts to flow as shown in FIG. 7. Therefore, the switching-current-waveform correction circuit 16a functions as a frequency correction circuit to generate the correcting current Irs from a predetermined on-duty and superimposes the correcting current on the current flowing through the switching element Q1.

As described above, the present embodiment provides a switching power-supply device applies a DC voltage obtained by rectifying input voltage of a commercial AC power source AC to a primary winding P of a transformer T, performs a switching operation of a switching element Q1 connected to the primary winding P of the transformer T, thereby generating a pulse voltage on a secondary winding S of the transformer T and outputting an output voltage Vo to a load, the output voltage Vo being rectified and smoothed by a rectification and smoothing circuit of a secondary side having a rectifier diode D1 and a smoothing capacitor Co. The switching power-supply device includes a shunt regulator Z1 functioning as an error amplifier that compares the output voltage Vo with a reference voltage and sends an error voltage as an FB signal to a primary side, a frequency generation circuit 13 generating a switching frequency according to the FB signal, an S/OCP detection circuit 15 functioning as an off timing determination circuit that determines a timing at which the switching element Q1 is turned off, by comparing a signal depending on the FB signal with a current flowing through the switching element Q1, and a switching-current-waveform correction circuit 16 functioning as a frequency correction circuit that corrects the switching frequency generated by the frequency generation circuit 13, according to an on-duty of the switching element Q1.

According to this configuration, in a case where the load condition is the same, the switching frequency can be corrected based on the on-duty varying depending on the input voltage, thereby realizing an operation by an optimal switching frequency depending on the input voltage. For example, according to suppressing a change of the switching frequency based on the determination of a load region or the AC 200V system, the apparatus is operated at the optimal switching frequency. As a result, improvement of optimal efficiency in both the AC 100V system and the AC 200V system is achieved.

Further, according to the present embodiment, the switching-current-waveform correction circuit 16 generates a correcting current Irs increased as the on-duty increases and superimposes the correcting current on a current flowing through the switching element Q1, which is compared with the FB signal by the S/OCP detection circuit 15.

According to this configuration, the switching frequency can be corrected based on the on-duty with a simple configuration.

According to the present embodiment, the switching-current-waveform correction circuit 16a generates the correcting current Irs from a predetermined on-duty.

According to this configuration, the correcting current Irs can be generated from the on-duty that will be taken only by the AC 100V system, for example. Accordingly, it is possible to increase the switching frequency at an early stage, in the condition where the AC 100V system is changed from the no load to the heavy load.

Although the specific embodiments of this disclosure has been disclosed above, the invention is not limited to the above-mentioned embodiments but can be modified in various forms without departing from the gist of the invention.

What is claimed is:

1. A switching power-supply device, which applies a DC voltage obtained by rectifying input voltage of an AC power source to a primary winding of a transformer and performs a switching operation of a switching element connected to the primary winding of the transformer to generate a pulse voltage on a secondary winding of the transformer and output an output voltage to a load, the output voltage being rectified and smoothed by a rectification and smoothing circuit of a secondary side having a rectifier diode and a smoothing capacitor, the switching power-supply device comprising:

an error amplifier, which compares the output voltage with a reference voltage and sends an error voltage as a feedback signal to a primary side;

a frequency generation circuit, which generates a switching frequency according to the feedback signal;

an off timing determination circuit, which determines a timing at which the switching element is turned off, by comparing a signal depending on the feedback signal with a current flowing through the switching element; and a frequency correction circuit, which corrects the switching frequency generated by the frequency generation circuit, according to an on-duty of the switching element, wherein the frequency correction circuit generates a correcting current that increases as the on-duty increases, and wherein the frequency correction circuit superimposes the correcting current on the current flowing through the switching element, which is compared with the signal depending on the feedback signal by the off timing determination circuit.

2. The switching power-supply device according to claim 1, wherein the frequency correction circuit generates the correcting current from a predetermined on-duty.

* * * * *